United States Patent [19]

Williams

[11] Patent Number: 4,802,637
[45] Date of Patent: Feb. 7, 1989

[54] APPARATUS FOR BEING POSITIONED ON AN EXPANDABLE MANDREL

[76] Inventor: Logan D. Williams, 7395 Cotton Plant Cove, Memphis, Tenn. 38119

[21] Appl. No.: 184,679

[22] Filed: Apr. 22, 1988

[51] Int. Cl.$^4$ .................... B65H 75/24; B23B 31/40
[52] U.S. Cl. .................... 242/72 R; 242/46.4; 242/72 B; 279/2 R
[58] Field of Search ............ 242/72 R, 46.4, 72 B, 242/68.3; 279/2 R; 264/48, 48.1

[56] References Cited

U.S. PATENT DOCUMENTS

| | | | |
|---|---|---|---|
| 2,829,899 | 4/1958 | Drew et al. | 279/2 R |
| 3,362,721 | 1/1968 | Buck | 279/2 R |
| 3,396,918 | 8/1968 | Adamson | 242/72 R |
| 3,593,933 | 7/1971 | Grashorn | 279/2 R X |
| 3,811,632 | 5/1974 | Bassett | 242/46.4 |
| 3,918,652 | 11/1975 | Bassett | 242/46.4 |

FOREIGN PATENT DOCUMENTS 995257 11/1951 France.

*Primary Examiner*—Stuart S. Levy
*Assistant Examiner*—Steven M. Dubois
*Attorney, Agent, or Firm*—Walker & McKenzie

[57] ABSTRACT

An apparatus for being positioned between the outer circumference of an expandable mandrel and the inner circumference of a roll of sheet material. The apparatus includes a plurality of elongated, rigid beam members, each of the beam members having at least one transverse aperture therethrough; and elastic structure extending through the transverse apertures of the beam members for joining the beam members to one another to form an expandable sleeve for being inserted over the outer circumference of the expandable mandrel and for being inserted into the inner circumference of the roll of sheet material.

5 Claims, 2 Drawing Sheets

4,802,637

APPARATUS FOR BEING POSITIONED ON AN EXPANDABLE MANDREL

BACKGROUND OF THE INVENTION

1. Field of the Invention

The present invention relates, in general, to an apparatus for being positioned between the outer circumference of an expandable mandrel and the inner circumference of a roll of sheet material.

2. Description of the Related Art

Many processing operations require that rolls or coils of strip material, such as sheet steel aluminum, be rotatably supported as the material enters and/or leaves a processing operation. Such coils are commonly supported on stub axles having expandable mandrels which can be contracted to allow a coil of material to be easily inserted or removed from the axle and which can be expanded to firmly grip the coil of material. If the inner diameter of the center aperture or eye of the coil of material is larger than the maximum expansion of the mandrel, it will be impossible to firmly secure the coil to the axle using the expandable mandrel alone. The prior art solution to such a problem is to provide a flexible elastomer tube for being inserted between the mandrel and the eye of the coil to act as a spacer or adaptor between the mandrel and the eye of the coil. A major disadvantage to such a spacer tube is the difficulty of handling such a flexible tube when positioning the tube on the mandrel or removing the tube from the mandrel, especially since the elastomer construction results in a somewhat floppy component, and the size of the elements involved commonly results in a spacer tube weighing between 500 and 600 pounds that normally requires a fork lift or the like to handle and that is extremely difficult to handle when floppy. Another problem that occurs when using such neoprene spacer tubes is that since the typical expandable mandrel includes only a relative few "segments" that define the outer circumference of the mandrel, when these segments are fully expanded, there is a considerable gap between adjacent segments which will cause the neoprene sleeve to deform from a circular shape thereby causing the coil of material to also deform from a circular shape when only a relatively small amount of the material remains on the coil.

A preliminary patentability search conducted in class 242, subclasses 72 R and 110.1 disclosed the following patents: Morton, U.S. Pat. No. 1,116,608; Steuer et al., U.S. Pat. No. 1,895,427; McLaughlin, U.S. Pat. No. 2,325,001; Tidland, U.S. Pat. No. 2,950,071; Richel, U.S. Pat. No. 3,289,966; Cunningham et al., U.S. Pat. No. 3,544,016; and Kataoka, U.S. Pat. No. 4,496,114. None of the above patents disclosed or suggest the present invention.

SUMMARY OF THE INVENTION

The present invention is directed toward providing an improved apparatus for being inserted between a mandrel and the eye of a coil of strip material to act as a spacer between the mandrel and the eye of the coil. The concept of the present invention is to provide a plurality of elongated, rigid beam members, each of the beam members having at least one transverse aperture therethrough; and elastic means extending through the transverse apertures of the beam members for joining the beam members to one another to form an expandable sleeve for being inserted over the outer circumference of the mandrel and for being inserted into the eye of the coil of strip material.

DESCRIPTION OF THE PREFERRED EMBODIMENT

Figure 1:
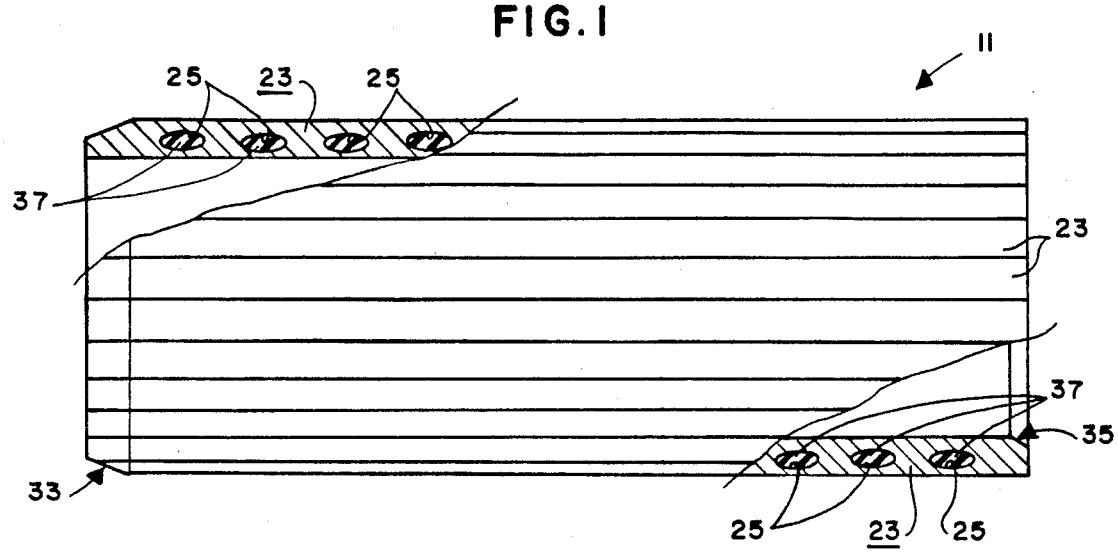
FIG. 1 is a side elevational view of the apparatus of the present invention with portions thereof broken away for clarity.

The preferred embodiment of the apparatus 11 of the present invention is used to mount a roll or coil 13 of sheet material, such as sheet steel or sheet aluminum, to an expandable mandrel 15 or the like. The apparatus 11 acts as a spacer between the mandrel 15 and the eye 17 of the coil 13. The mandrel 15 is typically mounted on a stub axle 19 that is rotatably supported by a bearing mechanism 21.

Figure 3:
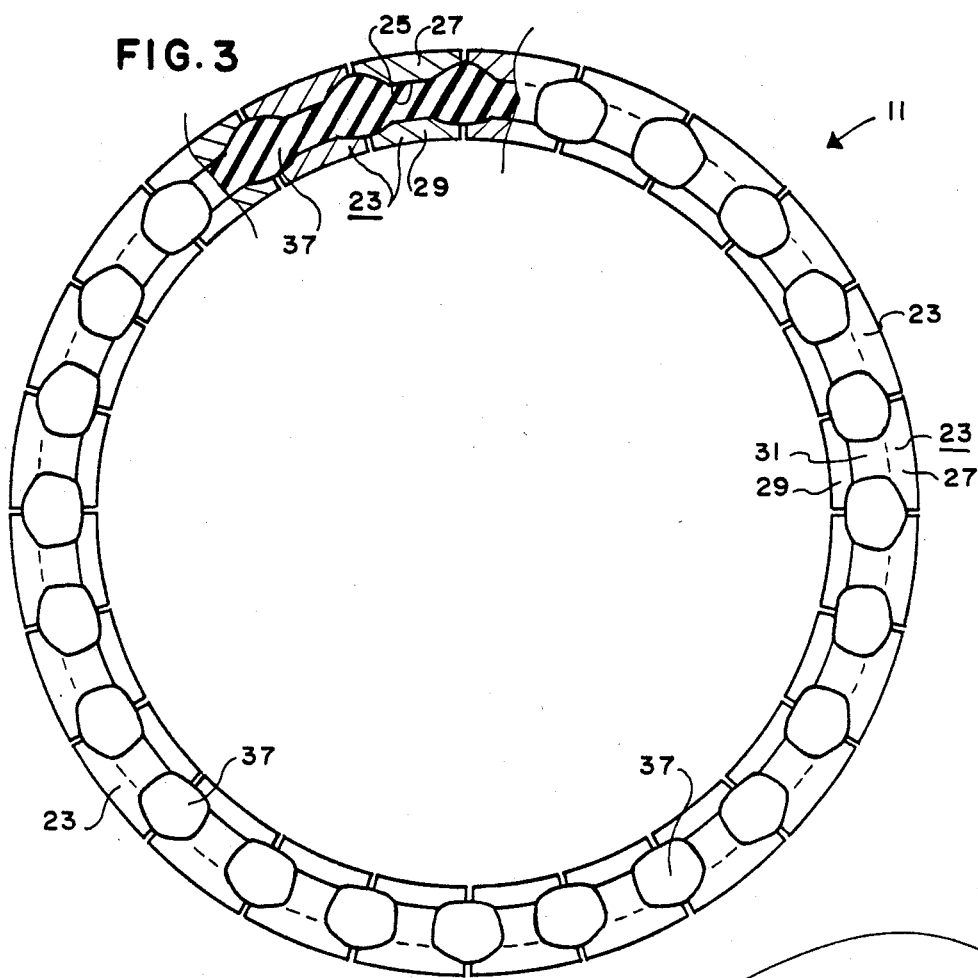
FIG. 3 is a front elevational view similar to FIG. 2 but showing the apparatus of the present invention in an expanded position.
Figure 4:
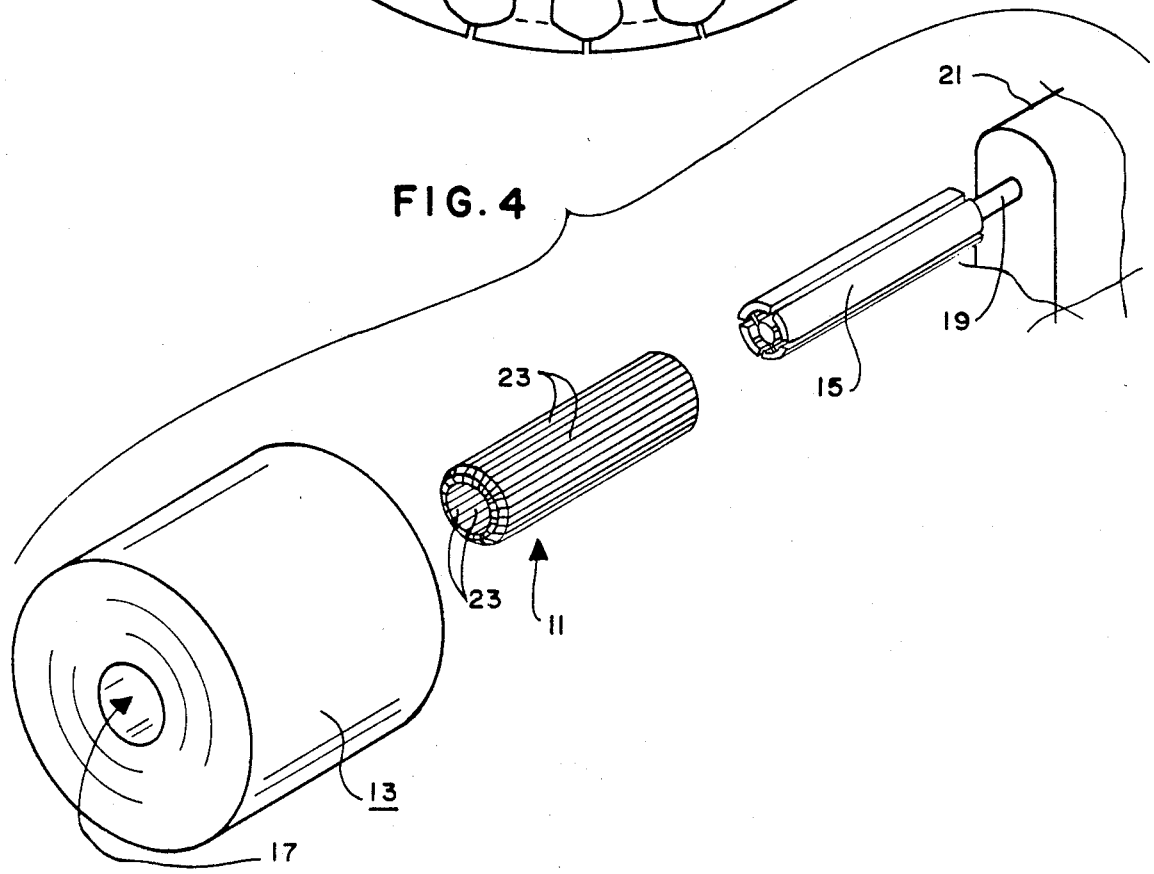
FIG. 4 is a somewhat diagrammatic exploded perspective view of the apparatus of the present invention shown associated with a coil of strip material and an expandable mandrel, etc.

The apparatus 11 includes a plurality of elongated, rigid beam members 23. Each beam member 23 has at least one transverse aperture 25 therethrough. Preferably, each beam member 23 is substantially I-shaped in cross section having an outer flange 27 and an inner flange 29 joined to one another by a web 31. Each beam member 23 preferably includes a plurality of transverse apertures 25 substantially evenly spaced along the length thereof. The transverse apertures 25 of each beam member 23 preferably extend through the web 31 thereof. One end of each beam member 23 preferably has a chamfer 33 on the outer flange 27 thereof while the other end of each beam member 23 preferably has a chamfer 35 on the inner flange 29 thereof for reasons which will hereinafter become apparent. The specific construction and size of each beam member 23 may vary as will now be apparent to those skilled in the art. Thus, for example, each beam member 23 may be constructed out of steel having an overall length of 63 inches and having an overall depth of approximately 2.25 inches with the outer flange 27 having an overall width of approximately 3 inches, with the inner flange 29 having an overall width of approximately 2.25 inches and with the web 31 having a width of approximately 1 inch. The apparatus 11 preferably includes a relatively large number of beams 23 so that only a relatively small gap is provided between adjacent beams 23 when the apparatus 11 is fully expanded as shown in FIG. 3. Thus, the apparatus 11 preferably includes twenty-four beams 23.

Figure 2:
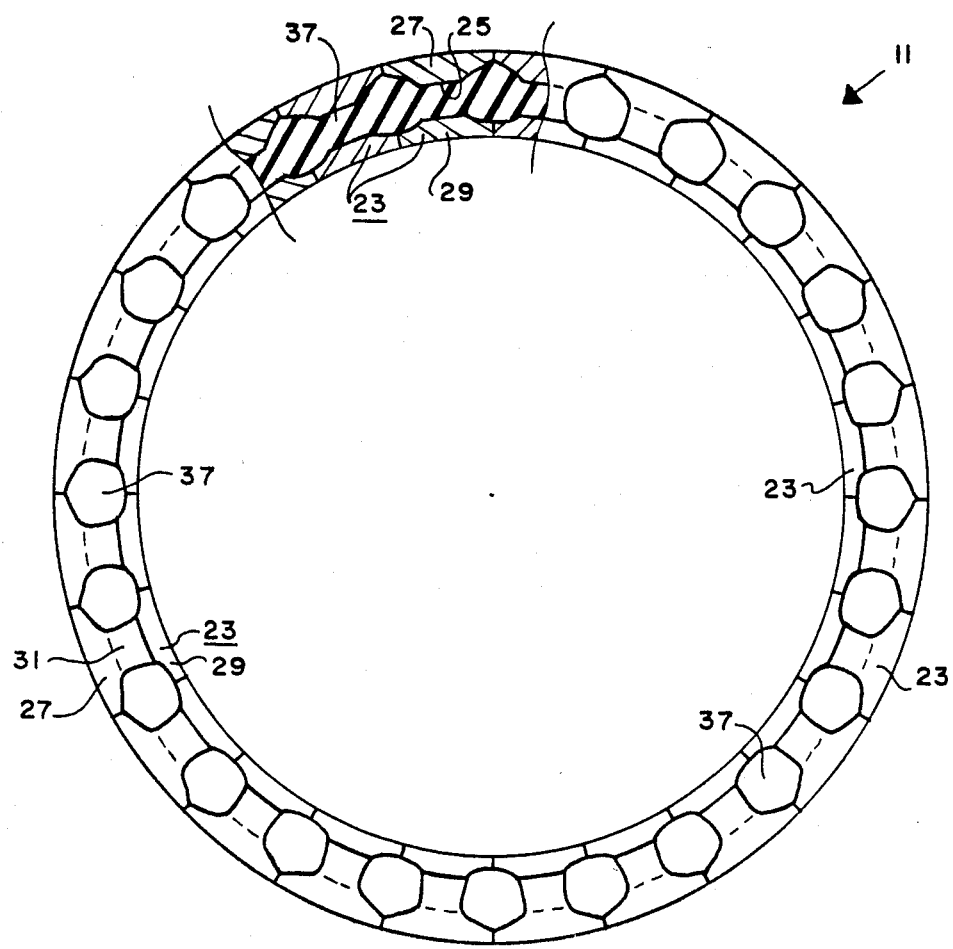
FIG. 2 is a front elevational view of the apparatus of the present invention with portions thereof broken away for clarity.

The apparatus 11 includes elastic means 37 extending through the transverse apertures 25 of the beam members 23 for joining the beam members 23 to one another to form an expandable sleeve for being inserted over the mandrel 15 and for being inserted into the eye 17 of the coil 13. The elastic means 37 may consist of a polyurethane elastomer material for normally holding the beam members 23 closely adjacent one another as shown in FIG. 2 whereby the sleeve formed by the beam members 23 is in a non-expanded position as shown in FIG. 2. The elastic nature of the elastic means 37 allows the sleeve formed by the beam members 23 to be moved between a first or retracted position as shown in FIG. 2 to a second or expanded position as shown in FIG. 3. More specifically, with the apparatus 11 positioned on the mandrel 15, expansion of the mandrel 15 will cause the sleeve to move from the first or retracted position to the second or expanded position. When the mandrel 15 is subsequently retracted, the elastic nature of the elastic means 37 will cause the sleeve to move from the second or expanded position to the first or retracted position.

To use the apparatus 11, the mandrel 15 is completely retracted and the apparatus 11 is then slipped over the mandrel 15. The chamfer 35 will ease the insertion of the apparatus 11 onto the mandrel 15. Next, the coil 13 is slipped over the apparatus 11. The chamfer 33 will ease the insertion of the coil 13 onto the apparatus 11. The mandrel 15 can then be expanded to cause the apparatus 11 to expand and to secure both the apparatus 11 and coil 13 to the mandrel 15 and axle 19.

Although the present invention has been described and illustrated with respect to a preferred embodiment and a preferred use therefor, it is not to be so limited since modifications and changes can be made therein which are within the full intended scope of the invention.

I claim:

1. An apparatus for being positioned between the outer circumference of an expandable mandrel and the inner circumference of a roll of sheet material; said apparatus comprising:
   (a) a plurality of elongated, rigid beam members, each of said beam members having at least one transverse aperture therethrough; and
   (b) elastic means extending through said transverse apertures of said beam members for joining said beam members to one another to form an expandable sleeve for being inserted over said outer circumference of said expandable mandrel and for being inserted into said inner circumference of said roll of sheet material.

2. The apparatus of claim 1 in which is included twenty-four of said beam members.

3. The apparatus of claim 1 in which each of said beam members is substantially I-shaped in cross section having an outer flange and an inner flange joined to one another by a web.

4. The apparatus of claim 3 in which said transverse apertures of said beam members extend through said web of each of said beam members.

5. The apparatus of claim 4 in which each of said beam members includes a plurality of said transverse apertures substantially evenly spaced along the length of said web thereof.

* * * * *